United States Patent
Groszek et al.

4,020,200
Apr. 26, 1977

[54] PROCESS OF PROTECTING UNDERWATER SURFACES WITH A WAX COATING CONTAINING BIOCIDES

[75] Inventors: Aleksander Jerzy Groszek, London; Colin Walter Parkes, Peachey near Uxbridge; Ronald Alfred Crump, Horsham, all of England

[73] Assignee: The British Petroleum Company Limited, London, England

[22] Filed: Mar. 7, 1975

[21] Appl. No.: 556,307

[30] Foreign Application Priority Data
Mar. 13, 1974 United Kingdom ............. 11186/74
Mar. 13, 1974 United Kingdom ............. 11187/74
June 6, 1974 United Kingdom ............. 25084/74

[52] U.S. Cl. .............................. 427/416; 106/15 R; 114/67 R; 428/484
[51] Int. Cl.$^2$ ..................... C09D 5/14; B05D 7/00; B32B 9/04
[58] Field of Search .......... 427/156, 321, 416, 441, 427/442; 428/484, 543; 114/67 R; 106/15 AF

[56] References Cited
UNITED STATES PATENTS

| | | | |
|---|---|---|---|
| 2,838,419 | 6/1958 | Francis | 427/416 X |
| 3,069,336 | 12/1962 | Waite et al. | 114/67 R X |
| 3,445,249 | 5/1969 | Leebrick | 106/15 AF |
| 3,639,583 | 2/1972 | Cardarelli et al. | 106/15 AF |
| 3,642,501 | 2/1972 | Minieri | 106/15 AF |
| 3,765,933 | 10/1973 | Lehureau et al. | 106/15 AF |

*Primary Examiner*—Philip Dier
*Attorney, Agent, or Firm*—Morgan, Finnegan, Pine, Foley & Lee

[57] ABSTRACT

Underwater surfaces are protected against weed and/or shell growth with a wax coating containing one or more biocides effective against weed and/or shell growth when dissolved or dispersed in wax. The biocides are preferably sea-water insoluble and may be fresh water soluble also. They are preferably thermally stable up to 150° C and soluble in wax. Suitable biocides are Cu, Zn, Ni, Co, Mn or Sn salts of carboxylic acids or polyacrylic acids, or organic compounds having an active structure containing S, Cl, N or O.

The coating may be 5–500 micrometers thick.

2 Claims, No Drawings

PROCESS OF PROTECTING UNDERWATER SURFACES WITH A WAX COATING CONTAINING BIOCIDES

This invention relates to a process for the treatment of underwater surfaces to reduce surface roughness and corrosion.

Surface roughness increases resistance to motion, thereby reducing a ship's speed and increasing its fuel consumption.

Surface roughness is of two types — intrinsic and extrinsic.

Intrinsic surface roughness depends on the state of the hull before painting, the care with which it is prepared before painting, the conditions under which the various layers of paint are applied, and, after a ship has been in service, the extent of deterioration of the paint work and the amount of corrosion which has taken place.

Extrinsic roughness is caused by fouling. This is an accumulative process in which marine organisms become attached and grow over an extended period of time. A fresh surface submerged in the sea becomes coated with a primary glycoprotein film within a matter of hours. This film acts as a substrate for bacteria which attach themselves by means of acidic polysaccharides. Diatoms and stalked protozoa become attached and grow after the bacterial film has become established. After longer periods of immersion two other principal types of fouling may be observed. The first class consists of algal growth, commonly referred to as weed fouling, and examples of such "weed" are Enteromorpha and Ectocarpus species. The second class consists of hard-shell organisms e.g. the stalked and acorn varieties of barnacles.

The combined surface roughness of these types and the amount of drag which this produces is a source of considerable expense to ship owners. For a speed loss of 1 knot, 24 days are lost per year. At 1974 charter rates this loss can be reckoned, in the case of a large crude oil carrier, as several hundred thousand pounds/year.

Intrinsic surface roughness can be kept down by skilled and careful workmanship carried out under good conditions, but even so, it cannot be eliminated. In many cases the paint has to be applied in adverse circumstances which leave a considerable degree of surface roughness.

In order to combat marine growth, an anti-fouling paint is usually applied as the top coat. This contains toxic materials, such as cuprous oxide, which are slowly leached out. The leaching process cannot be uniformly controlled and is undesirably rapid immediately after a vessel enters or re-enters service, with the result that higher concentrations of toxic material than are necessary are present around the ship initially, resulting in waste and pollution, and lower concentrations subsequently, resulting in a build up of marine growth. Furthermore, conventional anti-fouling paints produce an electrically polarised surface which roughens with age and encourages the primary film formation mentioned above. While sufficient toxins are being exuded, bacterial growth is inhibited, but when this is no longer the case, growth is encouraged.

When marine growth occurs under these conditions, it adheres strongly to ship's hulls and is usually removed by dry-docking, scraping and re-painting, an expensive and time-consuming procedure. Alternatively, some limited improvement can be achieved by high pressure water hosing or mechanical scrubbing. However, because of the porous nature of the paint the roots of the growth are not removed, so the improvement is only transient.

Thus the ship owner is faced with the problem of choosing short but frequent, or infrequent but longer, periods while his ship is out of commission.

To avoid the problem set out above, it has been proposed to coat ship's hull with a film of wax. Thus UK Pat. No. 1336103 claims a method of temporarily protecting a ship's hull after launching with a coating of wax. The complete specification of UK patent application No. 50525/73 claims a method of providing protection against fouling to a surface destined to be below water during use which comprises applying a wax layer to the surface, optionally over a paint coat, the layer being formed by spraying molten wax on to the surface (or paint coat where provided) and allowing it to harden in situ to form the layer. The sprayed layer may be smoothed by at least partially remelting it with a smoothing tool.

Practical experience with wax coatings on oil tankers and experimental results obtained from test plates immersed in sea water and from laboratory tests has confirmed the potential of wax coatings but has highlighted two important factors. These are:
  i. that the smoothness of the wax surface is important in reducing drag and requires special care and attention.
  ii. that wax itself has no inherent anti-fouling properties.

The present invention is concerned with the incorporation of biocides in the wax.

According to the present invention, a process for coating a surface intended for underwater use with wax is characterised in that the wax contains a biocide effective against weed and/or shell growth when dispersed or dissolved in the wax.

As indicated above, it is well known to protect underwater surfaces with anti-fouling paint, which contains toxins effective against weed and/or shell growth. Anti-fouling paint films have a degree of porosity and they are effective because the toxins are slowly leached out to give a continuous supply of toxin in the water adjacent to the paint surface. Wax films are, however, in general, impervious to water at any thickness above 5 micrometers. Experiments have shown, also, that when a wax film at least 50 micrometers thick is applied by spraying molten wax onto anti-fouling paint the toxins in the paint are effectively sealed in, do not migrate through the wax and, hence, do not reach the wax surface even after several months exposure to sea water.

It follows, therefore, that biocides effective when dispersed or dissolved in wax must differ in type or action from conventional toxins for anti-fouling. In particular, no leaching action is required; the biocides must repel weed and shells by a simple contact mechanism. In cases where the biocide molecule, or fragments of it, enter the fouling organism, the biocides must be chosen to act rapidly and before the organism has grown to the size of which it materially increases surface roughness. This contact action must be such as to maintain the surface free from living and dead organisms for long periods without replenishment. They are preferably water-insoluble particularly in sea-water so that loss from the wax surface is minimised and should also be insoluble if they are to be used with aqueous wax dispersions.

The wax coating may have a thickness of from 5 to 500 micrometers, preferably 50 to 300 micrometers. As indicated above, an underlying anti-fouling paint coating will be ineffective if the wax coating is at least 50 micrometers thick and is applied by spraying molten wax. An underlying anti-fouling paint may still be used, however, in case the wax coating is accidentally damaged or removed. Wax coatings below 50 micrometers e.g. 10 to 49 micrometers may also be used, in which case the biocide in the paint may migrate slowly through the coating to augment the surface action of the toxins in the wax.

The wax coating may be applied to a surface by spraying molten wax onto the surface as described in UK patent application No. 50525/73 or by applying an aqueous dispersion of a wax as described in UK patent application No. 11189/74. With either method the biocides are preferably soluble or easily dispersed in molten wax. They should be thermally stable up to at least 150° C, or up to at least 80° C in the case of wax dispersions. This thermal stability is obviously desirable when molten wax is sprayed onto the surface and is desirable also when an aqueous dispersion is used to facilitate the incorporation of the biocide in the dispersion.

Effective biocides may be of two types, metal salts and organic compounds having biocidally active molecular structures containing S, Cl, N or, in some cases, O. Each type may be further subdivided into known biocides selected for their effectiveness in wax and compounds not previously known as biocides.

In the metal salts, the metal cation may be copper, zinc, nickel, cobalt or manganese. Tin may be used but is not preferred. The acid anion is preferably derived from an organic acid to confer solubility in wax. Suitable acids may be alkyl, alkenyl or aryl carboxylic acids having from 2 to 100 carbon atoms. Another class of acids may be polymeric acids having an average molecular weight of from 200 to 500,000, e.g. polyacrylic acid.

Preferred salts may be copper or cobalt naphthenates, zinc stearate, nickel or manganese acetyl-acetonates (which have limited solubility in wax which are readily dispersable in molten wax) and Cu, Zn, Ni, and Sn polyacrylates.

The metal polyacrylates may have the following general

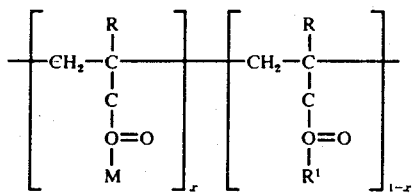

where R is H, or $C_1$–$C_4$ alkyl, $R^1$ is H or $C_1$–$C_{30}$ hydrocarbyl, M is a metal cation as defined above and x is such as to give from 5 to 50 molar % of metal in the polymer. The two structures may be randomly positioned in the polymer and when M is a polyvalent metal cation there will be additional cross-linking through the metal cation.

Preferred organic compounds containing S, Cl or N or combinations of these elements include the following examples, in which a cyclic structure is often beneficial:

(a) 4-chloro-m-cresol

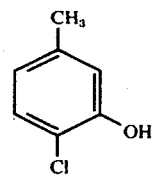

(b) p-dichlor-benzene

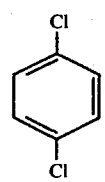

(c) tetramethylthiuram disulphide (thiram)

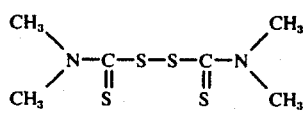

sold under the Registered Trade Mark "Nomersan" by Plant Protection Ltd.

(d) 2,3,5,6-tetra-chloro-4-(methyl-sulphonyl)pyridine

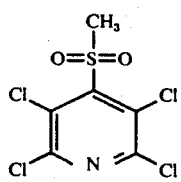

sold under the Registered Trade Mark "Dowicil" S13 by Dow Chemical Co. Ltd.

(e) dichlorophen

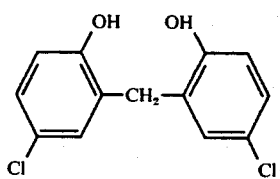

sold under the Registered Trade Mark "Panacide" by BDH Ltd.

(f) phenyl-dimethyl urea (diuron and monuron)

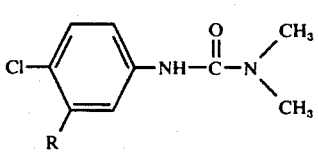

where R = H or Cl sold under the Registered Trade Marks "Karmet" and "Telvar" by DuPont (g) (di)-chloramine-T

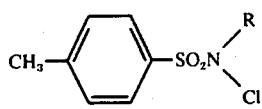

where R = H or Cl (h) 5,5-dimethylhydantoin

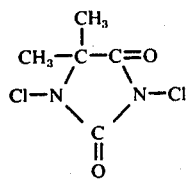

sold under the Registered Trade Mark "Halane" by BASF.

(i) tetrachloroglycoluril

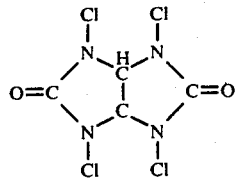

supplied by Diamond Chemicals.

In addition several type of oxygen-containing compounds are effective contact biocides. Phenols and bisphenols give satisfactory activity but must be chosen with care to ensure low values of water solubility and volatility. A particularly useful oxygen compound is the cyclic acetal, 6-acetoxy-2,4-dimethyl-m- dioxane

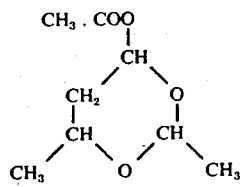

sold under the Registered Trade Mark Givgard DXN by Givaudan Ltd. Also effective are the polyionenes.

Polyionenes are polymers having positively charged nitrogen atoms in their backbone. They may be prepared by reacting diamines of general formula

with dihalides of general formula halogen - R' - halogen where R and R' may be the same or different saturated or unsaturated alkyl, cyclo-alkyl or aryl groups, with from 1–100 C atoms, preferably $C_1$–$C_{30}$ and preferably aliphatic groups.

The polymers have the general structure

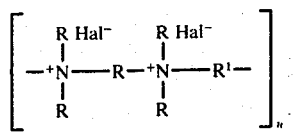

where $n$ preferably gives polymers of at least 1500 average molecular weight. In one specific case $N,N,N^1,N^1$ - tetramethyl ethylene diamine may be reacted with hexane-1,6-dibromide.

The halogen may be Br, I, Cl or F, Br being preferred for the initial preparation. The halogen may, however, be exchanged by treating the ionene with a known halogen-exchange material, e.g. a Br-ionene can be converted to an I-ionene by treatment with an aqueous solution of $KI/I_2$. The halogen used may affect the water-solubility, a Br-ionene from $N,N,N^1,N^1$ tetra-methyl ethylene diamine and hexane-1,6-dibromide being water-soluble, for example, while the corresponding I-ionene is water-insoluble.

The amount of biocide may be from 1 to 70% wt, more particularly 1 to 40% wt by weight of wax. As previously indicated only the biocide at the wax surface confers antifouling activity but the biocide is preferably uniformly dispersed through the wax coating to allow for wear of the coating.

Where individual biocides have been shown to exhibit particularly successful activity against a given form of fouling, e.g. weed growth, they may be combined with other biocides to give protection against a wider range of fouling organisms.

In preferred method of use a wax coating may be lightly scrubbed periodically, preferably under water and without drydocking the coated ship, so that fresh biocidally active surfaces may be produced.

A wide range of waxes may be used, but the wax preferably has a melting point of from 45° to 120° C and penetration value of from 1 to 60 mm × 10 by the method of ASTM D.1321. Suitable waxes include mineral waxes, e.g. paraffin wax, chlorinated paraffin wax, microcrystalline wax, slack wax, ozokerite and ceresine, vegetable or animal waxes, e.g. carnauba wax, and synthetic waxes, e.g. Fischer-Tropsch wax. Both oxidised and unoxidised waxes may be used.

The wax, whether applied by hot spraying or as an aqueous dispersion, may also contain from 1 to 20% wt of the wax of an alkyd or shellac resin to assist in conferring high surface gloss on the coating. Alternatively, polyethylene or polyvinyl acetate may be added for this purpose.

The present invention includes surfaces intended for underwater use having a wax coating containing a biocide effective against weed and/or shell growth when dispersed or dissolved in the wax.

The surfaces may be ships' hulls or other fixed or moveable underwater surfaces, e.g. the legs of offshore drilling rigs and production platforms.

The invention is illustrated by the following examples.

EXAMPLES 1–12

Film-forming compositions were prepared by adding certain biocides to molten paraffin wax (m.p. 60°–62° C) maintained at a temperature of 100° C.

Test plates 1½ inches × 4½ inches were coated with the different filmforming compositions by dipping into the molten wax at 100° C. The films had an average thickness of 150 micrometers. The test plates were immersed in the sea at a heavy fouling site at Singapore for a six week period. The average sea temperature during the immersion period was 29° C. The degree of fouling on the surface was then assessed and rated on a scale ranging from 1–10. On a plate rated 10, heavy fouling occurred; organisms including barnacles, filamentous algae, hydroids and ascidians were all present. On a plate rated 1, only microbial fouling was present and this did not cover more than 50 percent of the surface.

The results are shown in Table 1 below.

The viscosity of the polymer in 0.4 MKBr. was 0.0109 $m^3/kg$.

EXAMPLE 15

Preparation of polyionene bromide of Example 11

12.2g (0.05 moles) of 1,6 dibromohexane was added dropwise to a stirred solution of 5.8g (0.05 moles) of $N,N^1,N^1$, tetramethylethylene diamine in 12.5 mls of dimethylformamide/$H_2O$ (4:1) solvent mixture. The reaction mixture was stirred for 24 hrs. at 20° C, and consequently poured into a large excess of vigorously stirred acetone. The precipitated ionene was filtered off and dried in vacuum at 60° C (yield 13g). The viscosity of the polymer in 0.4 M KBr was 0.0121$M^3/kg$.

EXAMPLE 16

Preparation of poly (nickel acrylate) of Example 12

Example 13 was repeated using polyacrylic acid instead of polymethacrylic acid, and nickel nitrate instead of zinc sulphate.

Table 1

| | Biocide | Parts by weight paraffin wax | Parts by weight of biocide | Thermal stability of biocide | Solubility of biocide in wax | Solubility of biocide in water when incorporated in wax coating | Fouling Rating 1 – 10 |
|---|---|---|---|---|---|---|---|
| 1 Control | — | 100 | 0 | — | — | — | 10 |
| 2 | copper naphthenate | 80 | 20 | stable at 150° C | Excellent | Insoluble | 3 |
| 3 | Zinc stearate | 80 | 20 | stable at 150° C | Excellent | Isoluble | 2 |
| 4 | 4-chloro-m-cresol | 80 | 20 | Fumes evolved at 150° C | Excellent | Insoluble | 3 |
| 5 | Givgard DXN | 80 | 20 | Boils 66–68° C at 3mm Hg | Soluble | Insoluble | 2 |
| 6 | Chloramine T | 90 | 10 | Moderately thermally stable at 150° C | Slightly Soluble | Reacts slowly with water | 5 |
| 7 | p-dichlorobenzene | 80 | 20 | stable at 150° C | Soluble | Insoluble | 5 |
| 8 | Monuron | 95 | 5 | mpt 158–159° C | Slightly Soluble | Insoluble | 5 |
| 9 | Poly (zinc methacrylate) | 71.5 | 28.5 | stable at 150° C | Insoluble but Dispersible | Slightly Soluble | 1 |
| 10 | Polyionene-2,4-chloride | 80 | 20 | Stable at 150° C | Slightly Soluble | Insoluble | 3 |
| 11 | Polyionene-2,6-bromide | 83 | 17 | Stable at 150° C | Dispersible | Insoluble | 3 |
| 12 | Poly (nickel acrylate) | 67 | 33 | Stable at 150° C | Dispersible | Insoluble | 5 |

The following examples describe the preparation of the compounds used in Examples 9 to 12.

EXAMPLE 13

Preparation of poly (zinc methacrylate) of Example 9

40g of a polymethacrylic acid water solution (20% polyacid) was further diluted with 150 mls $H_2O$ and heated to approximately 50° C. To the stirred (Silverson stirrer) solution was added dropwise 25mls 2M NaOH solution. 25mls of 1M Zinc sulphate solution was then added dropwise to the stirred solution with the formulation of a white precipitate. 10g of the poly(-zine methacrylate) material was isolated.

EXAMPLE 14

Preparation of polyionene chloride of Example 10

12.5 (0.1 mole) di-chloro-butene-2 was added dropwise to a stirred solution of 11.6g (0.1 mole) of $N,N^1,N^1$ tetramethylethylene diamine in 25mls of water. The reaction mixture was stirred for 120 hours at 20° C and consequently poured into a large excess of vigorously stirred acetone. The precipitated ionene was filtered off and dried in vacuum at 60° C (yield 23g).

We claim:

1. A process for protecting an underwater surface against weed and/or shell growth comprising applying to said underwater surface to a thickness of from 5 to 500 micrometers a coating composition consisting essentially of a wax which is a film-forming component and in a major amount of the total amount of the total components of the coating composition, the coating also containing at least one biocide effective against weed and/or shell growing, said biocide being a polymeric material selected from polyionenes and metal salts of a polyacrylic acid having an average molecular weight of from 200 to 500,000, said metal being selected from the group consisting of copper, zinc, nickel, cobalt and tin, the total biocide component being in a minor amount of the total components of the coating composition, the biocide amount being from 1 to 70% by weight of the amount of wax.

2. A process as claimed in claim 1 wherein the wax is selected from the group consisting of paraffin wax, chlorinated paraffin wax, oxidized micro-crystalline wax, and carnauba wax.

* * * * *